United States Patent
Dover (10) Patent No.: US 9,686,248 B2
(45) Date of Patent: *Jun. 20, 2017

(54) SECURE SHARED KEY SHARING SYSTEMS AND METHODS

(71) Applicant: Micron Technology, Inc., Boise, ID (US)

(72) Inventor: Lance Walker Dover, Citrus Heights, CA (US)

(73) Assignee: Micron Technology, Inc., Boise, ID (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/141,489

(22) Filed: Apr. 28, 2016

(65) Prior Publication Data

US 2017/0019380 A1    Jan. 19, 2017

Related U.S. Application Data

(63) Continuation of application No. 14/507,526, filed on Oct. 6, 2014, now Pat. No. 9,331,989.

(51) Int. Cl.
*H04L 9/32* (2006.01)
*H04L 29/06* (2006.01)
(Continued)

(52) U.S. Cl.
CPC ........ *H04L 63/0428* (2013.01); *G06F 21/575* (2013.01); *H04L 9/006* (2013.01);
(Continued)

(58) Field of Classification Search
CPC .................. H04L 9/08; H04L 63/061
(Continued)

(56) References Cited

U.S. PATENT DOCUMENTS 5,937,063 A * 8/1999 Davis ................ G06F 12/1408
711/E12.092
7,779,273 B2 * 8/2010 Dale .................... G06F 9/4405
713/189
(Continued)

FOREIGN PATENT DOCUMENTS

WO    2013174554 A1    11/2013
WO    2014132155 A1    9/2014

OTHER PUBLICATIONS

PCT International Search Report & Written Opinion for PCT Application No. PCT/US2015/051436 mailed Jan. 13, 2016. 12 pgs.

*Primary Examiner* — Teshome Hailu
(74) *Attorney, Agent, or Firm* — Fletcher Yoder, P.C.

(57) ABSTRACT

Systems and methods used to securely communicate a shared key to devices. One embodiment describes a method to securely communicate a shared key to a first device and a second device that includes receiving, using the first device, a shared key and unique identifier pairing associated with the first device from a key generator; receiving, using a trusted third party, the shared key and unique identifier pairing from the key generator; generating, using the first device, a signature using the unique identifier and the shared key; transmitting, using the first device, the signature and the unique identifier to the trusted third party; verifying, using the trusted third party, the unique identifier based on the signature; determining, using the trusted third party, the shared key when the unique identifier is verified; and transmitting, using the trusted third party, the shared key to the second device to enable the first device and the second device to communicate securely by encoding and decoding communicated data using the shared key.

27 Claims, 3 Drawing Sheets

(51) Int. Cl.
*H04L 9/08* (2006.01)
*G06F 21/57* (2013.01)
*H04L 9/00* (2006.01)
*H04L 9/06* (2006.01)

(52) U.S. Cl.
CPC .......... *H04L 9/0625* (2013.01); *H04L 9/0631* (2013.01); *H04L 9/083* (2013.01); *H04L 9/0822* (2013.01); *H04L 9/0825* (2013.01); *H04L 9/0844* (2013.01); *H04L 9/321* (2013.01); *H04L 9/3236* (2013.01); *H04L 9/3247* (2013.01); *H04L 9/3249* (2013.01); *H04L 63/061* (2013.01); *H04L 63/0876* (2013.01)

(58) Field of Classification Search
USPC ........................................................ 713/171
See application file for complete search history.

(56) References Cited

U.S. PATENT DOCUMENTS

| | | | |
|---|---|---|---|
| 8,156,322 B2 | 4/2012 | Asnaashari et al. | |
| 8,214,630 B2 * | 7/2012 | Peterka | G01R 31/31719 713/1 |
| 8,745,365 B2 | 6/2014 | Jevans et al. | |
| 9,237,133 B2 | 1/2016 | Kruglick | |
| 2008/0256366 A1 * | 10/2008 | Dale | G06F 9/4405 713/189 |
| 2010/0082991 A1 | 4/2010 | Baldwin et al. | |
| 2010/0174906 A1 | 7/2010 | Li | |
| 2010/0217964 A1 * | 8/2010 | Peterka | G01R 31/31855 713/2 |
| 2010/0235627 A1 | 9/2010 | Kerschbaum et al. | |
| 2011/0035574 A1 * | 2/2011 | Jevans | G06F 9/4406 713/2 |
| 2012/0008784 A1 | 1/2012 | Hallam-Baker | |
| 2013/0080768 A1 | 3/2013 | Lagerway et al. | |
| 2013/0173903 A1 * | 7/2013 | Obligacion | G06F 21/575 713/150 |
| 2013/0173904 A1 * | 7/2013 | Obligacion | H04L 67/06 713/150 |
| 2013/0173906 A1 * | 7/2013 | Obligacion | H04L 63/0428 713/151 |

* cited by examiner

SECURE SHARED KEY SHARING SYSTEMS AND METHODS

CROSS-REFERENCE TO RELATED APPLICATIONS

The present application is a continuation of U.S. application Ser. No. 14/507,526, entitled "SECURE SHARED KEY SHARING AND METHODS," which was filed on Oct. 6, 2014, issued on May 3, 2016 as U.S. Pat. No. 9,331,989, and is incorporated by reference herein for all purposes.

BACKGROUND

Field of the Invention

The present invention relates generally to the secure communication of a shared cryptographic key, and particularly, to the communication of the shared cryptographic key between devices not connected by a secure channel.

Description of the Related Art

Generally, devices may utilize shared cryptographic keys to securely communicate with one another. For example, a first device may utilize the shared key to sign (e.g., encode) data and transmit the signed data to a second device. The second device may then utilize the shared key to verify (e.g., decode) the received data. In this manner, an outside party that intercepts the encoded data would not be able to decode the data without the shared key. Thus, securing communication with the use of a shared key is premised on the communicating devices each knowing the shared key.

In other words, the shared key may be securely communicated to each of the devices before using the shared key to encode and decode data. Often methods for securely communicating the shared key may utilize extensive mathematical calculations. For example, utilizing a Diffie-Hellman approach to communicate a shared key between devices may involve the devices performing modular arithmetic, which may require non-trivial computational processing. However, some devices, such as a memory device, may have limited processing power.

Accordingly, it would be beneficial to improve secure communication of a shared key, for example, by enabling communication of the shared key even with devices having limited processing power.

DETAILED DESCRIPTION OF SPECIFIC EMBODIMENTS

As described above, shared cryptographic keys are often used by devices to enable secure (e.g., encoded and/or signed) communication. More specifically, the devices may utilize the shared key to sign (e.g., encode) transmitted data and to verify (e.g., decode) received data. For example, a first device may sign data by performing a cryptographic hash on the data using the shared key and transmit the signed data along with the hash result to a second device. The second device may then verify the received data by performing the cryptographic hash using the shared key and comparing the results. As such, devices on either end of the communication may utilize the shared key. In other words, the shared key may be securely communicated to each of the communicating devices.

As can be appreciated, since the shared key is the basis of securing transmitted data, it is important that outside parties do not obtain the shared key. As such, the shared key should be securely communicated to the devices without an outside party determining the shared key. Various methods may be used to facilitate the secured transmission of the shared key to the devices. Such methods may include a Diffie-Hellman key exchange, a Ron Rivest, Adi Shamir and Leonard Adleman (RSA) system approach, or another public key infrastructure approach. However, these methods may be computationally complex, which utilizes significant processing power.

For example, to utilize a Diffie-Hellman key exchange, a first and a second device may first determine a prime modulus, such as 17, and a primitive root of the prime modulus, such as 3. Then, the first and second devices may each select a secret integer. For example, the first device may select 15 and the second device may select 13. Using their secret integers, the first and second devices may each raise the primitive root to its respective secret integer and perform a modulus operation using the prime modulus. For example, the first device may calculate $3^{15}$ mod 17, which equals 6, and the second device may calculate $3^{13}$ mod 17, which equals 12. The calculated result is then transmitted to the other device. Each receiving device may then raise the received result to its respective secret integer and perform a modulus operation using the prime modulus. For example, the first device may calculate $12^{15}$ mod 17, which equals 10, and the second device may calculate $6^{13}$ mod 17, which also equals 10. In this manner, both the first and second device may determine the shared key, for example, 10.

As such, both the first and second devices typically include processing components to quickly and efficiently perform modular arithmetic. More specifically, the processing components perform multiple exponential and modulus operation calculations. Additionally, to improve security, the size of the numbers used may be increased, for example, up to several hundred digits. In other words, in a real world situation, the exponential and modulus operation calculations may be much more complex than the example presented above.

However, some devices that wish to utilize a shared key for securing data may be limited in their processing capabilities. One such example may be a nonvolatile boot device used to boot a computing system. Generally, the nonvolatile boot device may include a processing component that performs limited operations and that has limited processing capabilities. For example, the processing component may be an arithmetic logic unit (ALU) that merely performs integer arithmetic and logic operations.

Although it may be possible to increase the processing capabilities of such devices, the cost may be prohibitive. In other words, it would be beneficial to enable secure communication of the shared key with the computing system without having to increase the processing capabilities of the nonvolatile boot device.

Accordingly, the present disclosure describes techniques that enable secure communication of a shared key with minimal processing requirements. For example, some embodiments may utilize a shared symmetric key for securing communication, which may be less computationally complex to implement than public key infrastructure (PKI) techniques. More specifically, a shared symmetric key approach may largely be implemented using combinatorial logic as compared to more extensive computational calculations used in PKI technique, such as modular arithmetic.

Additionally, some embodiments may securely communicate the shared key through the use of a trusted third party, such as a server. More specifically, a key generator may generate a unique identifier and a shared key pairing for a first device. The pairing may be stored in the first device, for example during manufacture, and in the trusted third party. To communicate the shared key to a second device, the first device may transmit its unique identifier and a signature, which may be generated using the shared key and a nonce (e.g., a random or pseudo-random number), to the trusted third party. The trusted third party may then use the unique identifier to retrieve the corresponding shared key and verify the signature. If the signature is verified, the trusted third party may be assured that the secure key it looked up based on the unique identifier is the same as the secure key stored on the first device. As such, the trusted third party may communicate the shared key to the second device via a secure channel without exposing the shared key on a communication channel between the first device and the second device. Subsequently, the first and second devices may communicate securely using the shared key.

Thus, as will be described in more detail below, the shared key may be securely shared with the devices even when a preexisting secure channel does not exist between the devices. In other words, another party that merely receives the signature and unique identifier may be unable to determine the shared key as long as the party does not have access to the unique identifier and shared key pairing, which may be previous shared with the trusted third party via the secure channel. Additionally, as will be described in more detail below, the shared key may be securely shared with the second device with minimal computing performed by the first device. More specifically, the processing by the first device may include merely generating the signature using the shared key and a nonce, for example, by performing a cryptographic hash operation on the unique identifier.

Figure 1:
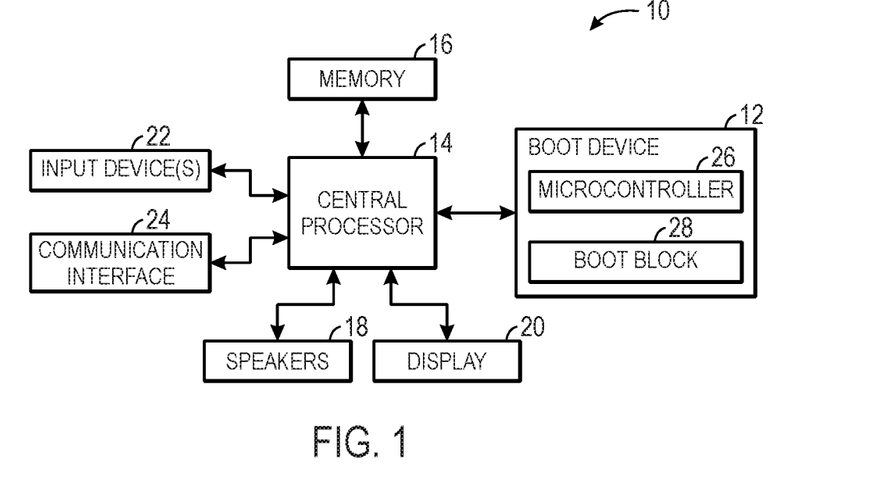
FIG. 1 illustrates a block diagram of a computing system, in accordance with an embodiment.

As described above, the techniques described herein may be particularly useful for a nonvolatile boot device in a computing system. To help illustrate, an embodiment of a computing system 10 with a nonvolatile boot device 12 is described in FIG. 1. The computing system 10 may be any of a variety of types such as a computer, pager, cellular phone, personal organizer, control circuit, etc. The various functional blocks shown in FIG. 1 may include hardware elements (including circuitry), software elements (including computer code stored on a computer-readable medium) or a combination of both hardware and software elements. It should further be noted that FIG. 1 is merely one example of a particular implementation and is intended to illustrate the types of components that may be present in computing system 10.

As depicted, the computing system 10 includes a central processor 14 and memory 16. More specifically, the central processor 14 may execute instructions stored in memory 16 to perform various operations in the presently described techniques. As such, the central processor 14 may include one or more general purpose microprocessors, one or more application specific processors (ASICs), one or more field programmable logic arrays (FPGAs), or any combination thereof. Additionally, the memory 16 may be a tangible, non-transitory, computer-readable medium that stores instructions executable by the central processor 14 and/or data processed by the central processor 14. In some embodiments, the memory 16 may include volatile memory, such as random access memory (RAM), and/or non-volatile memory, such as read only memory (ROM), flash memory, ferroelectric RAM (F-RAM), hard disks, floppy disks, magnetic tape, optical discs, or any combination thereof.

Additionally, the central processor 14 may utilize the other components in the computing system 10 to perform various functions. One function may include the communication of information with a user, which may include providing information to a user and receiving control commands from the user. For example, the central processor 14 may provide audio data to the speakers 18 and instruct the speakers 18 to communicate the audio data to a user as sound. Additionally, the central processor 14 may provide video data to the display 20 and instruct the display 20 to display a graphical user interface that presents information to the user. Furthermore, to facilitate receiving information, the central processor 14 may receive control commands from a user via one or more input devices 22. In some embodiments, the input device 22 may include buttons, switches, a keyboard, a light pen, a mouse, a digitizer and stylus, a voice recognition system, a touch sensitive display, or any combination thereof.

Additionally, information may be communicated with external devices via the communication interface 24. More specifically, the communication interface 24 may enable the computing system 10 to connect to a network, such as a personal area network (e.g., a Bluetooth network), a local area network (e.g., 802.11x Wi-Fi network), and/or for a wide area network (e.g., a 3G cellular network). Additionally, the communication interface 24 may enable the computing system 10 to connect directly to external devices, for example, via serial cables.

To initialize the above-described functions as well as others, startup routine instructions stored in the boot device 12 may be executed. As depicted, the boot device 12 includes a microcontroller 26 and one or more non-volatile memory, such as a boot block 28, which stores the startup routine instructions. Accordingly, upon powering up the computing system 10, the startup routine instructions may be retrieved from the boot block 28 so that the central processor 14 may execute the instructions. More specifically, the startup routine may establish the foundation for proper functioning of the computing system 10. For example, in some embodiments, when the central processor 14 executes the startup routine instruction, a malware error-detection may be performed to detect the presence of malicious, defective, or otherwise corrupted code stored in memory 16.

Accordingly, it is important to ensure secure communication of startup routine instructions from the boot device 12 to the central processor 14. One method may be the use of a shared key. More specifically, the boot device 12 may sign (e.g., encode) startup routine instructions using the shared key and communicate the signed instructions to the central processor 14. The central processor 14 may then verify (e.g., decode) the signed instructions using the shared key and execute the startup routine instructions. In other words, to utilize a shared key, the shared key may be securely shared with both the boot device 12 and the central processor 14.

As described above, various computationally intensive methods for sharing the shared key may be utilized. Thus, to utilize such methods, the processing power of the central processor 14 and the microcontroller 26 should be sufficient to efficiently perform the computations. For example, the microcontroller 26 may be required to efficiently perform modular arithmetic. However, the processing power utilized by the microcontroller 26 to perform other operations, such as encoding/decoding data, may be less than used to perform computationally intensive calculations, such as modular arithmetic.

Accordingly, since the shared key may be shared only when connected to a different central processor 14 or, at most, upon each powering on of the computing device 10, techniques described herein enable securely sharing the shared key with the boot device 12 and the central processor 14 without utilizing computationally intensive calculations and exposing the shared key across an insecure communication channel. As such, the processing capabilities of the microcontroller 26 may be reduced, and thus, the manufacturing costs of the boot device 12 may also be reduced. In other words, the techniques described herein may enable a shared key to be securely communicated even when one party (e.g., device) is limited by processing power.

However, the techniques described herein are not limited to processing power limited devices. In other words, the techniques may be utilized by any devices to securely communicate a shared key. To help illustrate, a block diagram of a shared key sharing system 30 is described in FIG. 2. In the depicted embodiment, the shared key sharing system 30 may enable secure communication between device A 32 (e.g., boot device 12) and device B 34 (e.g., central processor 14). In other words, the shared key sharing system 30 may securely communicate a shared key with device A 32 and device B 34.

Figure 2:
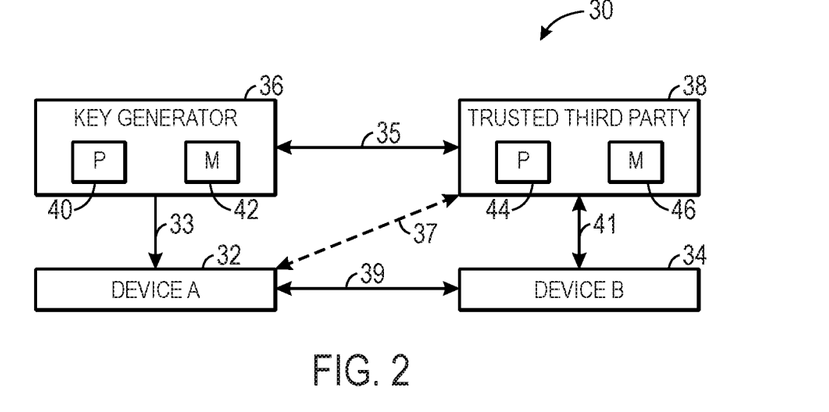
FIG. 2 illustrates a block diagram of devices used to communicate a shared key, in accordance with an embodiment.

To facilitate communicating the shared key, the key sharing system 30 includes a key generator 36 and a trusted third party 38. In some embodiments, the key generator 36 may generate a unique identifier and shared key pairing for devices at a secure facility. Accordingly, as depicted, the key generator 36 may include one or more processing components 40 and memory 42 to facilitate functions of the key generator 36. In some embodiments, the unique identifier may be an identifier that uniquely identifies device A 32, such as a media access control (MAC) address. Additionally, the shared key may be a cryptographic key (e.g., a symmetric key or a private key) used to secure communicated data.

In some embodiments, the key generator 36 may be part of a manufacturing facility that manufactures device A 32. To help illustrate, when device A 32 is manufactured, the manufacturer may utilize the key generator 36 to generate a unique identifier and shared key pairing and store the pairing in device A 32. For example, the pairing may be statically programmed into the non-volatile memory of device A, such as in a portion of the boot block 28 not directly accessible by or exposed to the central processor 14 or another entity. Additionally, since the pairing is stored while at the secure facility, the possibility of an unwanted intrusion is minimized. As such, the unique identifier and shared key pairing may be securely communicated to device A 32. Accordingly, as depicted, the key generator 36 is communicatively coupled to device A 32, via a first secure communication channel 33.

In addition to generating a pairing for device A 32, the key generator 36 may generate unique identifier and shared key pairings for each of a plurality of devices, for example, for each device manufactured. The generated pairings may then be securely communicated to the trusted third party 38.

Generally, the trusted third party 38 may be a database that is capable of securely communicating with the key generator 36 and securely storing a plurality of unique identifier and shared key pairings. For example, the trusted third party 38 may be a remote server located in the cloud. Accordingly, as depicted, the trusted third party 38 may include one or more processing components 44 to facilitate secure communication with the key generator 36 and memory 46 to store the received pairings.

Any suitable means for securing communication between the key generator 36 and the trusted third party 38 may be utilized. For example, the processing components 40 and 44 may contain sufficient processing capabilities to encrypt the data communicated between the key generator 36 and the trusted third party 38. In some embodiments, the encryption may utilize Data Encryption Standard (DES), Advanced Encryption Standard (AES), International Data Encryption Algorithm (IDEA), RSA encryption, Diffie-Hellman encryption, or another PKI encryption technique. Accordingly, as depicted, the key generator 36 is communicatively coupled to the trusted third party 38 via a second secure communication channel 35. In other words, the key generator 36 and the trusted third party 38 may include sufficient processing power to utilize encryption techniques to secure the second communication channel 35. In some embodiments, the second secure communication channel 35 may utilize a network, such as a wide area network (WAN) or a local area network (LAN).

As will be described in more detail below, when a process for sharing the shared key with device B 34 is initialized, device A 32 may communicate a signature and its unique identifier to the trusted third party 38. In some embodiments, device A 32 may communicate directly with the trusted third party 38. Accordingly, as depicted, device A 32 and the trusted third party 38 may be communicatively coupled via a third communication channel 37, which may not be secure. In some embodiments, the third communication channel 37 may utilize a network, such as a wide area network (WAN) or a local area network (LAN).

In other embodiments, device A 32 may communicate with the trusted third party 38 through device B 34. In other words, device A 32 may communicate the signature and its unique identifier to device B 34 and device B 34 may relay the unique identifier and the signature to the trusted third party 38. Accordingly, as depicted, device A 32 is communicatively coupled to device B 34 via a fourth communication channel 39, which may not initially be secure. For example, in the computing device 10, the fourth communication channel 39 may be a data bus that communicatively couples the central processor 14 and the boot device 12.

As will be described in more detail below, once the trusted third party 38 receives the unique identifier and signature, the trusted third party 38 may use the received unique identifier to retrieve the corresponding shared key and use the shared key to verify the received signature. If the signature is verified, the trusted third party 38 may securely communicate the shared key to device B 34.

Generally, any suitable means for securing communication between the trusted third party 38 and device B 34 may be utilized. For example, the processing components 44 and the central processor 14 may contain sufficient processing capabilities to encrypt the data communicated between the trusted third party 38 and device B 34. In some embodiments, the encryption may utilize Data Encryption Standard (DES), Advanced Encryption Standard (AES), International Data Encryption Algorithm (IDEA), RSA encryption, Diffie-Hellman encryption, or another PKI encryption technique. Accordingly, as depicted, the trusted third party 38 is communicatively coupled to device B 34 via a fifth secure communication channel 41. In other words, the trusted third party 38 and device B 34 may include sufficient processing power to utilize encryption techniques to secure the fifth communication channel 41. For example, in the computing device 10, the central processor 14 and the trusted third party may be communicatively coupled via a network connected to the communication interface 24. In other words, the fifth secure communication channel 41 may utilize a network, such as a wide area network (WAN) or a local area network (LAN).

Once device B 34 receives the shared key, device A 32 and device B 34 may communicate securely by encoding and decoding communicated data using the shared key. In this manner, the data communicated between device A 32 and device B is secured by signing the data using the shared key, which verifies the integrity of the communicated data. As described above, securely communicating the shared key utilizing the techniques described herein may be enabled by setting up the key sharing system 30.

Figure 3:
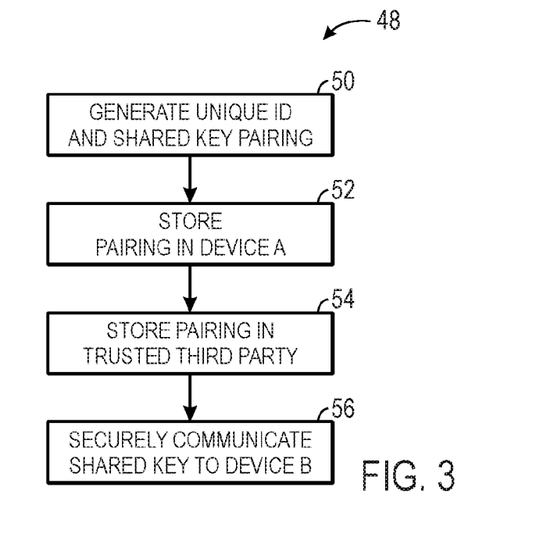
FIG. 3 illustrates a process flow for preparing the devices of FIG. 2 to communicate a shared key, in accordance with an embodiment.

One embodiment of a process 48 for setting up the key sharing system 30 is described in FIG. 3. Generally, the process 48 includes generating a unique identifier and a shared key pairing (process block 50), storing the pairing in a first device (process block 52), transmitting the pairing for storage in a trusted third party (process block 54), and securely communicating a shared key to a second device (process block 56). In some embodiments, process 48 may be implemented by instructions stored in one or more tangible, non-transitory, computer readable medium, such as memory 16, 42, or 46 and/or boot block 28 (either alone or in combination), and executed by one or more processing components, such as central processor 14, processing component 40 or 44, and/or microcontroller 26 (either alone or in combination).

Accordingly, in some embodiments, the key generator 36 may generate a unique identifier and shared key pairing for device A 32 (process block 50). More specifically, the key generator 36 may generate the unique identifier to uniquely identify device A 32. For example, in some embodiments, the unique identifier may be a MAC address, which includes a serial number and a manufacturer identifier. More specifically, the serial number may indicate the order in which device A 32 was manufactured. In other words, to generate the serial number, the key generator 36 may assign a serial number to one device, increment the serial number, and assign the incremented serial number to the next device. In other embodiments, the unique identifier may be randomly generated, for example, based on sets of rules.

Additionally, the key generator 36 may generate the shared key, which may be used to encode/decode communicated data with device A 32. More specifically, the shared key may be generated based on the type of encoding/decoding used for communication between device A and device B. In some embodiments, the shared key may be generated based on particular sets of rules. In other embodiments, the shared key may be a large randomly generated string, which may include numbers, letters, and/or symbols. The size of the shared key may be selected to reduce the possibility of an outside party being able to guess all possibilities of the key. Accordingly, the shared key may be 80 bits, 128 bits, 256 bits, or more.

In some embodiments, the unique identifier and the shared key may be generated separately. For example, the unique identifier for device A 32 may be generated by a manufacturer, which may not have access to an algorithm for generating the shared key. Subsequently, a separate secure facility may generate the shared key. In other words, the key generator 36 may include a manufacturing facility and/or additional secure facilities.

Once the unique identifier and the shared key for device A 32 are generated, the key generator 36 may store the pairing in memory 42. More specifically, the unique identifier and the shared key may be stored such that they correspond to one another. In other words, the corresponding shared key may be determined based on the unique identifier. In some embodiments, when the shared key is paired with a single unique identifier, the unique identifier may be determined based on the shared key Additionally, the key generator 36 may store the unique identifier and the shared key pairing in device A 32 (process block 52). In some embodiments, the pairing may be stored in device A 32 during manufacture. For example, during manufacture of the boot device 12, the key generator 36 may statically program the pairing into the non-volatile memory not directly accessible by or exposed to another entity, such as a portion of the boot block 28 not directly accessible by the central processor 14. In some embodiments, the pairing may be hardwired into device A 32, for example, using a discrete circuit. In other embodiments, the unique identifier for device A 32 may be stored by a manufacturer, which may not have access to the shared key. Subsequently, a separate secure facility, for example the secure facility that generated the shared key, may store the shared key in device A such that it is paired with the unique identifier. In other words, the pairing may be stored in the boot device 12 after the manufacture of the boot device 12 is complete.

More specifically, the pairing may be stored in device A 32 at a secure facility, such as a manufacturing facility. In some embodiments, the secure facility may include an intrusion prevention system to reduce the possibility of an outside party gaining access to the pairing. As such, particularly when the pairing is stored during manufacture, the shared key may be communicated to device A 32 securely.

Furthermore, the unique identifier and the shared key pairing may be stored in the trusted third party 38 (process block 54). More specifically, the pairing may be communicated from the key generator 36 to the trusted third party 38, for example, via a network. In such embodiments, the pairing may be securely communicated by encrypting the transferred data. More specifically, the key generator 36 may encrypt the pairing and communicate the encrypted pairing to the trusted third party 38. The trusted third party 38 may then decrypt the received pairing and store the decrypted pairing in memory 46.

Then, the shared key may be securely communicated from the trusted third party 38 to device B 34 (process block 56). In some embodiments, the shared key may be communicated from the trusted third party 38 to device B 34, for example, via a network. In such embodiments, the shared key may be securely communicated by encrypting the transferred data. More specifically, the trusted third party 38 may encrypt the shared key and communicate the encrypted key to device B 34. Device B 34 may then decrypt the received key and store the decrypted shared key, for example, in memory 16.

However, since the shared key is used to secure communication between device A 32 and device B 34, the shared key must be kept secret. Accordingly, the process for communicating the shared key to device B 34 may include security measures to reduce the possibility of an outside party obtaining the shared key. To help illustrate, a data flow between the trusted third party 38, device B 34, and device A 32 used to communicate the shared key is described in FIG. 4.

Figure 4:
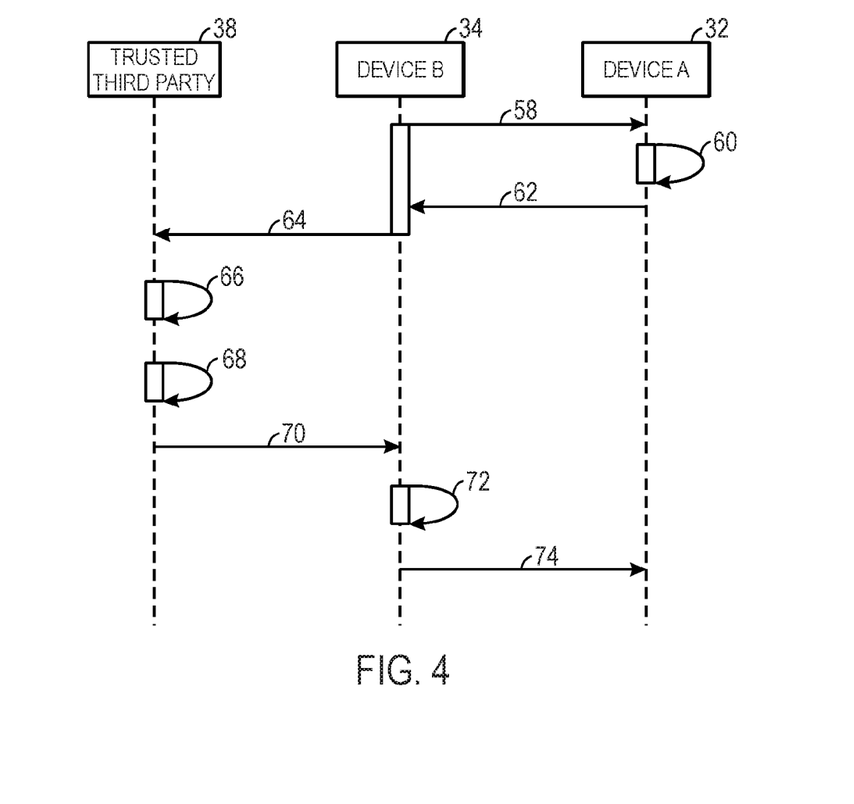
FIG. 4 illustrates a data flow diagram between the devices of FIG. 2, in accordance with an embodiment.

In the depicted embodiment, device B 34 may transmit a request to device A 32 for its unique identifier and a signature (arrow 58). For example, in the computing system 10, the central processor 14 may communicate the request to the boot device 12 via a data bus. In some embodiments, the signature may be generated using a nonce, which may be a random or pseudo-random number used to provide originality of a message. Accordingly, along with the request, device B 34 may transmit the nonce. In other embodiments, the trusted third party 38 may transmit (not shown) the request along with the nonce to device A 32.

In response to the request, device A 32 may generate the signature (arrow 60). In some embodiments, the signature may be generated by performing a cryptographic hash on the unique identifier using the nonce and the shared key. For example, in the computing system 10, the microcontroller 26 may generate the signature.

Then, device A 32 may transmit the unique identifier along with the signature to device B 34 (arrow 62) and device B 34 may relay the unique identifier and the signature to the trusted third party (arrow 64). For example, in the computing system 10, the boot device 12 may communicate the unique identifier and the signature to the central processor 14 via a data bus. The central processor 14 may relay the unique identifier and the signature to the trusted third party via a network connected to the communication interface 24. In other embodiments, device A 32 may communicate (not shown) the unique identifier and the signature directly to the trusted third party 38.

Using the received unique identifier, the trusted third party 38 may retrieve the shared key stored in device A 32 (arrow 66). Additionally, using the shared key, the trusted third party 38 may verify the received signature (arrow 68). For example, with reference to the computing system 10 described above, the trusted third party 38 may retrieve the shared key from memory 46 and verify the signature using processing component 44. More specifically, the trusted third party 38 may verify the signature by performing the same operation (e.g., a cryptographic hash) on the unique identifier using the shared key as performed by device A 32 to generate the signature.

If the signature determined by the trusted third party 38 matches the signature received from device A 32, the trusted third party 38 may communicate the shared key to device B 34 (arrow 70). For example, with reference to the computing system 10 described above, the trusted third party 38 may communicate the shared key to the central processor 14 via a network connected to the communication interface 24.

Once the shared key is received, device B 34 may store the shared key (arrow 72). For example, in the computing system 10, the central processor 14 may store the shared key in memory 16. As described above, limiting the exposure of the shared key is important. As such, the central processor 14 may store the shared key so that it is not directly accessible by or exposed to another entity. In other words, the shared key may be stored securely in device B.

In this manner, subsequent communication between device A 32 and device B 34 (arrow 74) may be secured by using the shared key to verify the integrity of transmitted data, for example, by signing the transmitted data with the shared key. For example, in the computing system 10, the central processor 14 may retrieve the shared key from memory 16 and sign (e.g., encode) the data by performing a cryptographic hash using the shared key. Upon receiving the signed data, the microcontroller 26 may retrieve the shared key from the non-volatile memory (e.g., boot block 28) and verify (e.g., decode) the data by performing the same cryptographic hash using the shared key. More specifically, the results may be verified by comparing the results of the cryptographic hash performed by the central processor 14 with the results of the cryptographic hash performed by the microcontroller 26. And, when the results match, the microcontroller 26 may verify the identity of the central processor 14 and/or that the data has not been altered. The microcontroller 26 may then process verified data.

Similarly, the microcontroller 26 may retrieve the shared key from the non-volatile memory (e.g., boot block 28) and sign (e.g., encode) the data by performing a cryptographic hash using the shared key. Upon receiving the signed data, the central processor 14 may retrieve the shared key from memory 16 and verify (e.g., decode) the data by performing the same cryptographic hash using the shared key. More specifically, the results may be verified by comparing the results of the cryptographic hash performed by the central processor 14 with the results of the cryptographic hash performed by the microcontroller 26. And, when the results match, the central processor 14 may verify the identity of the microcontroller 26 and/or that the data has not been altered. The central processor 14 may then process the verified data. Various encoding/decoding techniques may be utilized such as Twofish, Serpent, AES, Blowfish, CAST5, RC4, 3DES, and IDEA, for example. As such, the communication of data may be secured without exposing the shared key to other entities.

Figure 5:
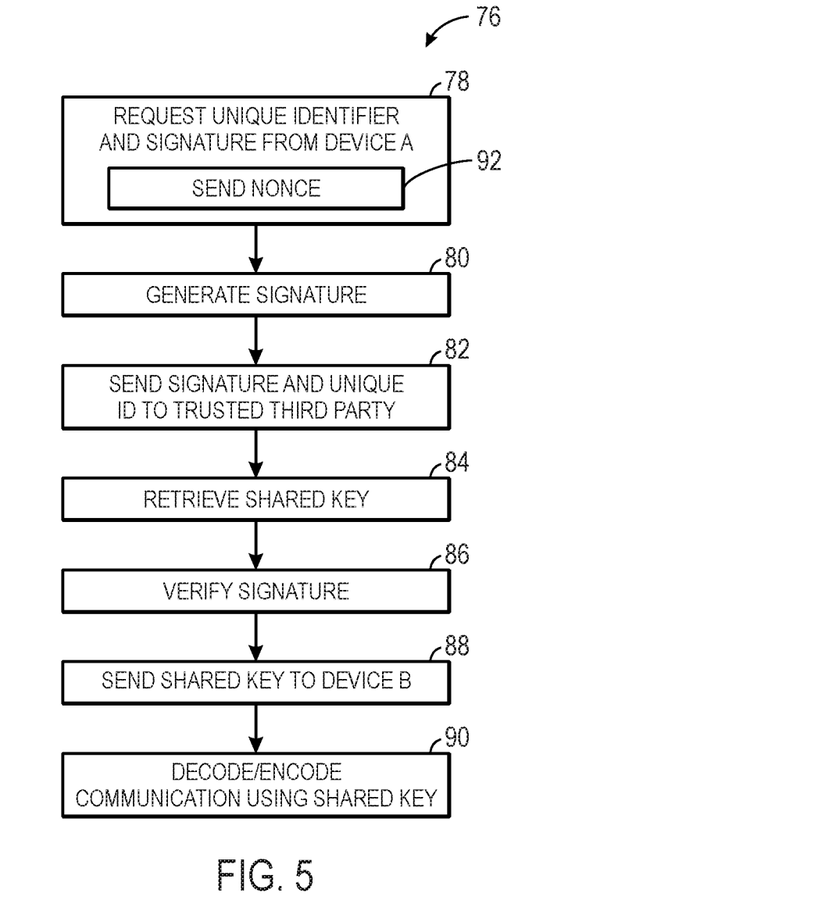
FIG. 5 illustrates a process flow for securely communicating the shared key between the devices of FIG. 2, in accordance with an embodiment.

One embodiment of a process 76 for implementing the data flow is described in FIG. 5. Generally the process 76 includes requesting a unique identifier and a signature from a first device (process block 78), generating the signature (process block 80), sending the unique identifier and the signature to a trusted third party (process block 82), retrieving a shared key (process block 84), verifying the signature (process block 86), sending the shared key to a second device (process block 88), and decoding/encoding communication using the shared key (process block 90). In some embodiments, process 76 may be implemented by instructions stored in one or more tangible, non-transitory, computer readable medium, such as memory 16, 42, or 46 and/or boot block 28, and executed by one or more processing component, such as central processor 14, processing component 40 or 44, and/or microcontroller 26.

As in the data flow, the process 76 may be initialized by device B 34. For example, the device B 34 may initialize the process 76 when device B 34 determines that communication with device A 32 is desired but that device B 34 does not know the shared key. In other embodiments, the process 76 may be initialized by the trusted third party 38 and/or device B 34. For example, the process 76 may be initialized when device B 34 or the trusted third party 38 determines that device B 34 and device A 32 are communicatively coupled for a first time, for example, upon commissioning of the computing system 10 or upon each power on of the computing system 10.

Once the process 76 is initialized, a request for a unique identifier and a signature are communicated to device A 32 (process block 78). As in the data flow, the request may be communicated from device B 34 to device A 32, for example, when device B 34 initializes the process 76. In other embodiments, when the trusted third party 38 initializes the process 76, the request may be communicated from the trusted third party 38 to device B 34 and device B 34 may relay the request to the device A 32. Additionally or alternatively, the request may be communicated directly from the trusted third party 38 to device A 32.

As described above, the signature may be generated using the unique identifier, the shared key, and/or a nonce. Accordingly, the nonce used to generate the signature may be communicated to device A 32 along with the request (process block 92). Generally, the nonce may be a random or pseudo-random number. In some embodiments, the nonce may be generated by the trusted third party 38 so that the trusted third party 38 may utilize the nonce to verify the signature returned by device A 32. In other embodiments, the nonce may be generated by device B 34 and communicated to both devices A 32 and the trusted third party 38.

In response to receiving the request, device A 32 may generate a signature (process block 80). More specifically, device A 32 may generate the signature using the shared key and the received nonce. In some embodiments, device A 32 may generate the signature by performing a cryptographic hash on the unique identifier using the shared key and the nonce as the key. The output (e.g., result) of the cryptographic hash function is the signature. Additionally, since the nonce may be a random or pseudo random number, the signature may be difficult for an outside party to recreate.

Device A 32 may then communicate the generated signature and its unique identifier to the trusted third party 38 (process block 82). As in the data flow, the signature and unique identifier may be communicated from device A 32 to device B 34 and device B 34 may relay the signature and unique identifier to the trusted third party 38. Additionally or alternatively, the signature and unique identifier may be communicated directly from device A 32 to the trusted third party 38.

Using the received unique identifier, the trusted third party 38 may retrieve the corresponding shared key for device A 32 (process block 84). As described above, the trusted third party 38 may store unique identifier and shared key pairings for multiple devices, for example, in memory 46. Accordingly, the trusted third party 38 may search the stored pairings to find the shared key that corresponds with the received unique identifier.

The trusted third party 38 may then verify the signature received from device A 32 (process block 86). More specifically, since the trusted third party 38 has the shared key and the nonce, the trusted third party 38 may perform the same operation used by device A 32 to generate the signature. For example, the trusted third party 38 may perform the same cryptographic hash on the unique identifier using the shared key and the nonce as the key. The output of the cryptographic hash function may then be compared with the received signature. If the signatures match, the trusted third party 38 may determine that device A 32 does in fact know the shared key. In other words, since the shared key is unique to device A 32, the trusted third party 38 may use the signature to verify the identity of device A 32.

On the other hand, if the signatures do not match, the trusted third party 38 may determine that an outside party is pretending to be device A 32. In other words, the trusted third party 38 may determine that the outside party is attempting to determine the shared key. In some embodiments, this may indicate an attempted intrusion into the computing system 10. As such, the trusted third party 38 may block further attempts to retrieve the shared key and/or notify an operator of the possible intrusion.

If the signature is verified, the trusted third party 38 may securely communicate the shared key to device B 34 (process block 88). More specifically, the trusted third party 38 may encrypt the shared key and transmit the encrypted key to device B 34. Device B 34 may then decrypt and store the shared key, for example, in memory 16.

Subsequently, device A 32 and device B 34 may communicate securely by encoding and decoding data using the shared key (process block 90). Generally, device A 32 may sign (e.g., encode) data using the shared key and transmit the signed data to device B 34. In some embodiments, device A 32 may sign the data by performing a cryptographic hash on the data using the shared key. Device A 32 may then transmit the signed data to device B. In some embodiments, the signed data may include the data along with a result of a cryptographic hash performed by device A 32. Device B 34 may then verify (e.g., decode) and process the received data. In some embodiments, Device B 34 may verify the signed data by performing the same cryptographic hash on the data and comparing the result of the cryptographic hash performed by device A 32 with the result of the cryptographic hash performed by device B 34. More specifically, when the results match, device B 34 may verify the identity of device A 32 and/or that the data has not been modified (e.g., tampered with). Additionally, in some embodiments, the same cryptographic hash function may be performed by device A 32, the trusted third party 38, and device B 34 to generate the signature and to sign/verify transmitted data.

In this manner, device A 32 and device B 34 may set up a secure communication channel (e.g., communication channel 39). Accordingly, in the computing system 10, the boot device 12 may securely communicate the startup routine instructions to the central processor 14. More specifically, the microcontroller 26 may sign (e.g., encode) the startup routine instructions using the shared key and transmit the encoded instructions to the central processor 14. The central processor 14 may then verify (e.g., decode) the instructions and execute the startup instructions. Additionally, since the shared key is securely communicated to both the central processor 14 and the boot device 12, the risk of an outside party altering the startup routine instructions is minimized.

Thus, the technical effects of the present disclosure include enabling the secure communication of a shared key to devices. In fact, the present techniques enable the shared key to be securely communicated to devices even when one of the devices is limited in processing power.

While the invention may be susceptible to various modifications and alternative forms, specific embodiments have been shown by way of example in the drawings and have been described in detail herein. However, it should be understood that the invention is not intended to be limited to the particular forms disclosed. Rather, the invention is to cover all modifications, equivalents, and alternatives falling within the spirit and scope of the invention as defined by the following appended claims.

What is claimed is:

1. A computing device configured to be communicatively coupled to a third party server via a network, comprising:
 a boot device configured to:
  store a unique identifier, a shared key, and startup routine instructions;
  generate a signature based at least in part on the unique identifier and the shared key;
  communicate the signature and the unique identifier to the third party server to enable the third party server to verify identity of the boot device and retrieve the shared key when the identity of the boot device is verified; and generate encoded data by encoding the startup routine instructions based at least in part on the shared key; and a central processing unit communicatively coupled to the boot device via a data bus, wherein the central processing unit is configured to:

receive the encoded data from the boot device via the data bus;

receive the shared key from the third party server via the network when the identity of the boot device is verified by the third party server;

determine the startup routine instructions by decoding the encoded data based at least in part on the shared key; and execute the startup routine instructions to initialize the computing device.

2. The computing device of claim 1, wherein:

the boot device is configured to generate the signature by performing a first cryptographic hash on the unique identifier based at least in part on the shared key; and the third party server is configured to:

retrieve the shared key based at least in part on the unique identifier received from the boot device;

perform a second cryptographic hash on the unique identifier based at least in part on the shared key; and verify identify of the boot device when a first result of the first cryptographic hash and a second result of the second cryptographic hash match.

3. The computing device of claim 1, wherein:

the boot device is configured to generate the encoded data by performing a first cryptographic hash on the startup routine instructions based at least in part on the shared key, wherein the encoded data comprises the startup routine instructions and a first result of the first cryptographic hash; and the central processing unit is configured to:

determine the startup routine instructions by performing a second cryptographic hash on at least a portion of the encoded data based at least in part on the shared key; and execute the startup routine instructions to initialize the computing device when a second result of the second cryptographic hash matches the first result of the first cryptographic hash.

4. The computing device of claim 1, wherein:

the boot device comprises non-volatile memory configured to store the startup routine instructions, the unique identifier, and the shared key; and the non-volatile memory comprises read only memory (ROM), flash memory, ferroelectric RAM (F-RAM), a hard disk, a floppy disk, magnetic tape, an optical disc, or any combination thereof.

5. The computing device of claim 1, comprising a communication interface configured to communicatively couple the computing device to the network;

wherein the network comprises a personal area network, a local area network, a wide area network, or any combination thereof.

6. The computing device of claim 1, wherein:

the boot device comprises a boot block configured to store the startup routine instructions; and the boot block is not accessible by the central processing unit.

7. The computing device of claim 1, wherein the central processing unit is configured to:

determine the startup routine instructions upon the computing device powering on; and execute the startup routine instructions to perform error-detection on data stored in a memory component of the computing device.

8. The computing device of claim 1, wherein:

the shared key comprises a cryptographic key, a symmetric key, or a private key; and the unique identifier comprises a media access control address that identifies the boot device.

9. The computing device of claim 1, wherein the computing device comprises a computer, a pager, a cellular phone, a personal organizer, or a control circuit.

10. A computing system configured to facilitate secure communication between two or more of a plurality of electronic devices, comprising:

a third party server communicatively coupled to one or more of the plurality of electronic devices via a network, wherein the third party server is configured to:

store a first pairing configured to associate a first shared key and a first unique identifier, wherein first shared key is configured to be used by a first electronic device of the plurality of electronic devices to encode first transmitted data and the first unique identifier is configured to indicate identity of the first electronic device;

receive a first signature and the first unique identifier from one of the plurality of electronic devices;

determine a second signature based at least in part on the first unique identifier and the first shared key;

determine that the first signature was generated by the first electronic device when the first signature and the second signature match; and communicate the first shared key to a second electronic device of the plurality of electronic devices when the first signature was generated by the first electronic device to enable the second electronic device to:

determine instructions by decoding the first transmitted data received from the first electronic device using the first shared key; and execute the instructions to perform an operation in the second electronic device.

11. The computing system of claim 10, wherein:

the first electronic device is communicatively coupled to the second electronic device via a data bus and the first electronic device is configured to:

store the instructions; and generate the first transmitted data by performing a first cryptographic hash on the instructions based at least in part on the first shared key, wherein the first transmitted data comprises the instructions and a first result of the first cryptographic hash; and the second electronic device is configured to:

determine the instructions by performing a second cryptographic hash on at least a portion of the first transmitted data based at least in part on the shared key; and execute the instructions to initialize operation of the second electronic device when a second result of the second cryptographic hash matches the first result of the first cryptographic hash.

12. The computing system of claim 10, wherein the third party server is configured to, when the first signature and the second signature do not match:

indicate an attempted intrusion into the computing system;

block subsequent attempts to retrieve the first shared key; or both.

13. The computing system of claim 10, wherein the third party server is configured to store a second pairing configured to associate a second shared key and a second unique identifier, wherein the second shared key is configured to be used by a third electronic device of the plurality of electronic devices to encode second transmitted data and the second unique identifier is configured to indicate identity of the third electronic device.

14. The computing system of claim 10, wherein the third party server is configured to communicate the first shared key to the second electronic device by implementing a public key infrastructure technique.

15. A communication network configured to communicatively couple a plurality of electronic devices, comprising:

a first communication channel configured to communicatively couple a first electronic device that stores data and a second electronic device that performs an operation based at least in part on the data, wherein the first communication channel is configured to facilitate communication of the data after the data is encoded by the first electronic device using a shared key to the second electronic device;

a second communication channel configured to communicatively couple the first electronic device and a third electronic device that stores a pairing between the shared key and a unique identifier associated with the first electronic device, wherein the second communication channel is configured to facilitate communication of a signature generated by the first electronic device based at least in part on the shared key and the unique identifier to the third electronic device; and a third communication channel configured to communicatively couple the second electronic device and the third electrical device, wherein the third communication channel is configured to facilitate communication of the shared key from the third electronic device to the second electronic device after the third electronic device verifies identify of the first electronic device based on the signature to enable the second electronic device to perform the operation based at least in part on the data received from the first electronic device via the first communication channel after the data is decoded using the shared key.

16. The communication network of claim 15, wherein:

the data stored in the first electronic device comprises startup routine instructions; and the operation performed by the second electronic device comprises initializing the second electronic device based at least in part on the startup routine instructions.

17. The communication network of claim 15, wherein the third communication channel is configured to connect to a communication interface of the second electronic device.

18. The communication network of claim 15, wherein the communication network comprises a personal area network, a local area network (e.g., 802.11x Wi-Fi network), a wide area network, or any combination thereof.

19. The communication network of claim 15, wherein:

the first communication channel comprises a data bus; and the third communication channel comprises a first network.

20. The communication network of claim 19, wherein the second communication channel comprises:

the data bus and the first network; or a second network.

21. The communication network of claim 15, wherein the second communication channel is configured to facilitate communication of the signature from the first electronic device to the third electronic device by:

communicating the signature from the first electronic device to the second electronic device via the first communication channel; and communicating the signature from the second electronic device to the third electronic device via the third communication channel.

22. A computing system, comprising:

a first electronic device configured to be communicatively coupled to a second electronic device via a first communication channel and communicatively coupled to a third electronic device via a second communication channel, wherein the first electronic device is configured to:

transmit a request to the second electronic device via the first communication channel, wherein the request comprises a nonce and a request that the second electronic device communicate a signature generated by the second electronic device based at least in part on the nonce, a shared key, and a unique identifier associated with the second electronic device to the third electronic device;

receive an encrypted key from the third electronic device via the second communication channel when the third electronic device verifies identity of the second electronic device based at least in part on the signature;

decrypt the encrypted key to determine the shared key;

receive data encoded by the second electronic using the shared key via the first communication channel;

decode the data based at least in part on the shared key; and perform an operation based at least in part on the data after the data is decoded.

23. The computing system of claim 22, wherein:

the data encoded by the second electronic device comprises startup routine instructions;

the first electronic device is configured to perform the operation by initializing the first electronic device based at least in part on the startup routine instructions; and the third electronic device comprises a trusted third party.

24. The computing system of claim 22, wherein the first electronic device is configured to decrypt the encrypted key using a public key infrastructure technique.

25. The computing system of claim 24, wherein the public key infrastructure technique comprises Data Encryption Standard (DES), Advanced Encryption Standard (AES), International Data Encryption Algorithm (IDEA), Diffie-Hellman encryption, or Ron Rivest, Adi Shamir and Leonard Adleman (RSA) encryption.

26. The computing system of claim 22, wherein the first electronic device is configured to transmit the request to the second electronic device upon powering on the first electronic device.

27. The computing system of claim 22, wherein the first electronic device is configured to:
- decode the data by:
    - determining a first result of a first cryptographic hash performed by the second electronic device using the shared key;
    - executing a second cryptographic hash on the data received from the second electronic device using the shared key; and
    - verifying that the data was transmitted from the second electronic device without alteration when a second result of the second cryptographic hash matches the first result of the first cryptographic hash; and
- perform the operation based on the data only after the data is verified.

* * * * *